United States Patent [19]

Kikuchi

[11] Patent Number: 5,265,341
[45] Date of Patent: Nov. 30, 1993

[54] BATTERY POWERED LINE TRIMMER ARM REST

[75] Inventor: Naoki Kikuchi, Chandler, Ariz.

[73] Assignee: Pyobi Outdoor Products, Inc., Chandler, Ariz.

[21] Appl. No.: 11,340

[22] Filed: Jan. 29, 1993

[51] Int. Cl.⁵ .............................................. B26B 7/00
[52] U.S. Cl. ..................................... 30/276; 30/296.1
[58] Field of Search ...................... 30/276, 296.1, 298, 30/298.4, 295, 312; 8/8

[56] References Cited

U.S. PATENT DOCUMENTS

| | | | |
|---|---|---|---|
| D. 250,450 | 12/1978 | Tiedemann | 56/12.7 |
| D. 255,764 | 7/1980 | Lombard | D8/8 |
| D. 301,009 | 5/1989 | Pilatowicz et al. | D8/8 |
| D. 303,483 | 9/1989 | Takahashi et al. | D8/8 |
| D. 317,852 | 7/1991 | Fujiwara et al. | D8/8 |
| 712,843 | 11/1902 | Paul | 30/296.1 |
| 3,886,716 | 6/1975 | Sellers | 56/17.4 |
| 4,179,805 | 12/1979 | Yamada | 30/296.1 |
| 4,237,610 | 12/1980 | Bradus et al. | 30/276 |
| 4,391,041 | 7/1983 | Porter-Bennett | 30/296.1 |
| 4,860,451 | 8/1989 | Pilatowicz et al. | 30/276 |
| 4,996,773 | 3/1991 | Albertson | 30/298 |
| 5,181,369 | 1/1993 | Everts | 30/276 |

OTHER PUBLICATIONS

Weed Eater Operator's Manual, Model: Cordless Clipstik TM, Dec. 17, 1990.

Primary Examiner—Douglas D. Watts
Assistant Examiner—Hwei-Siu Payer
Attorney, Agent, or Firm—Brooks & Kushman

[57] ABSTRACT

A battery powered line trimmer having a forward and rearward handle attached thereto, and further having an arm cradle atop the battery casing allowing the operator to rest his forearm upon it during operation. The arm cradle allowing the operator to maintain control of and maneuver the line trimmer by using the rear handle and arm cradle should the need arise for him to release his grip of the forward handle while cutting vegetation. The line trimmer further has a relatively high ratio of mass movement of inertia about a vertical axis extending through the center of gravity to mass of the line trimmer.

3 Claims, 2 Drawing Sheets

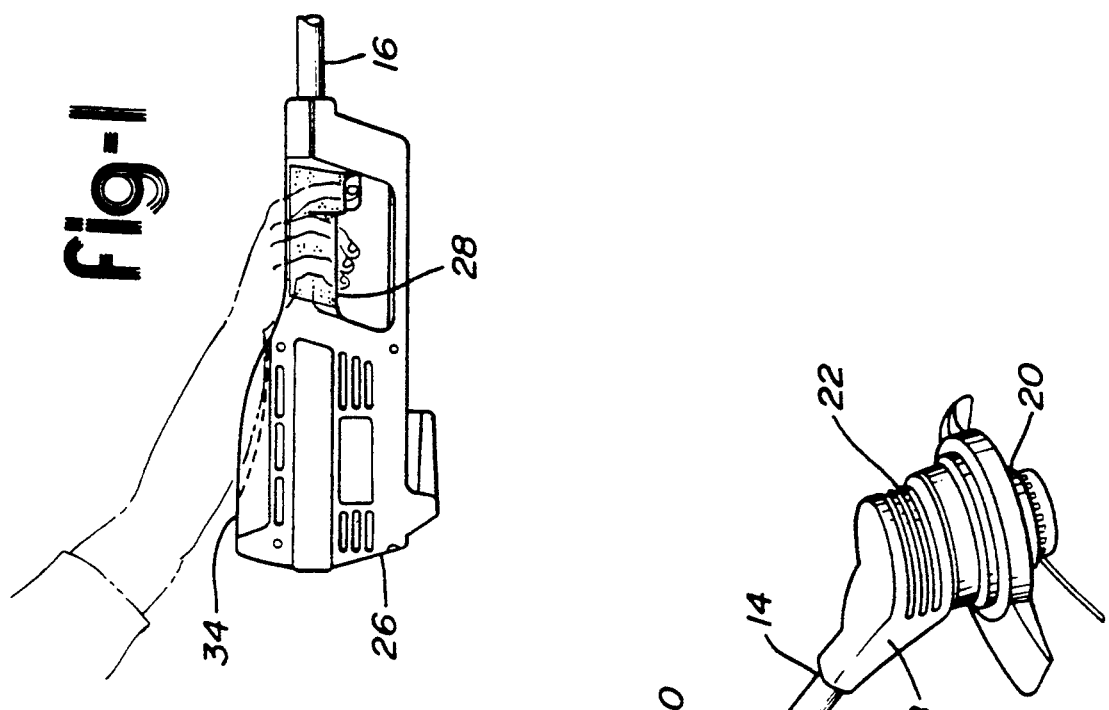
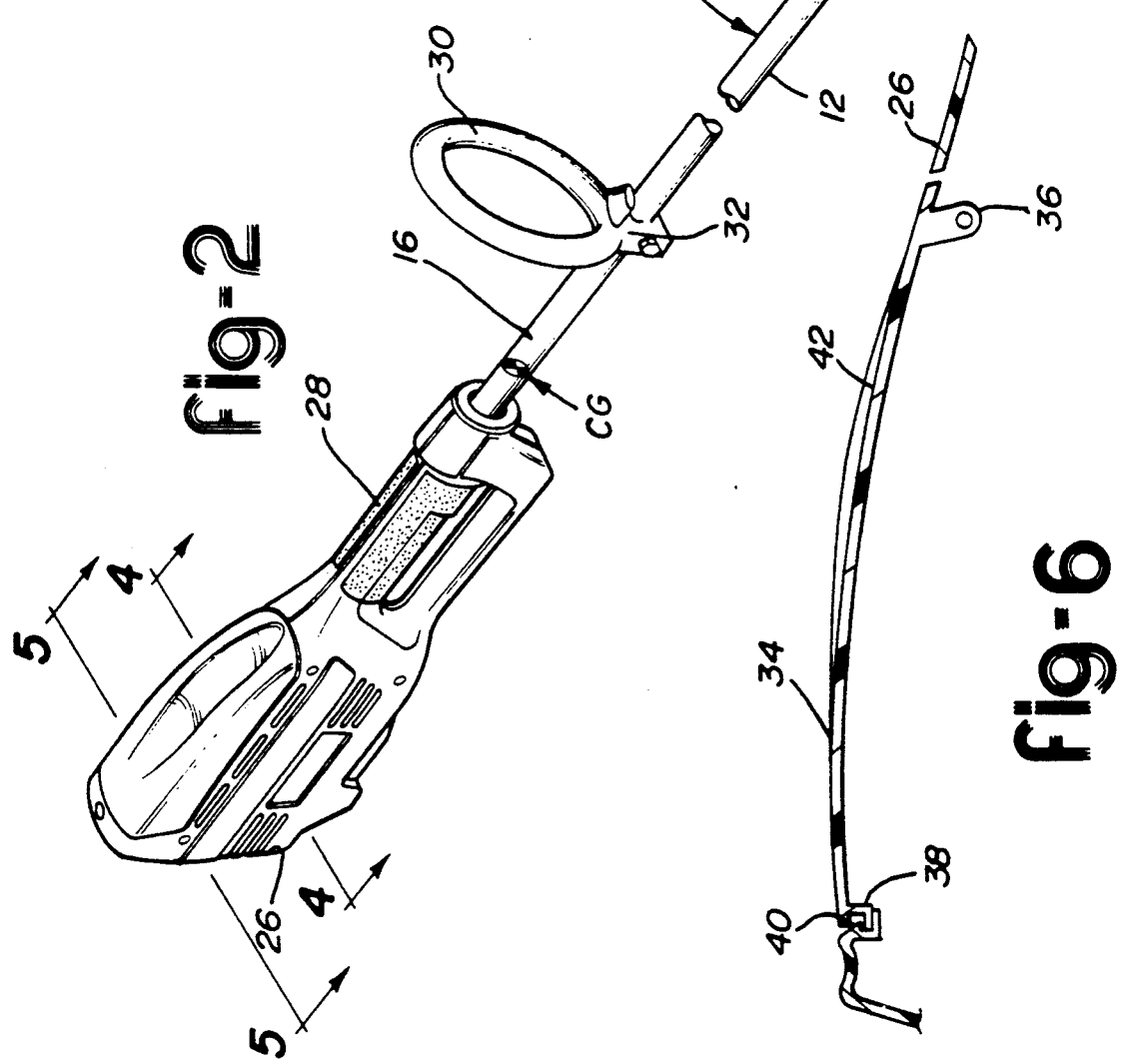
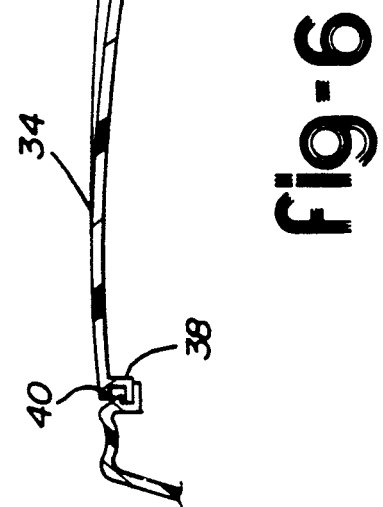

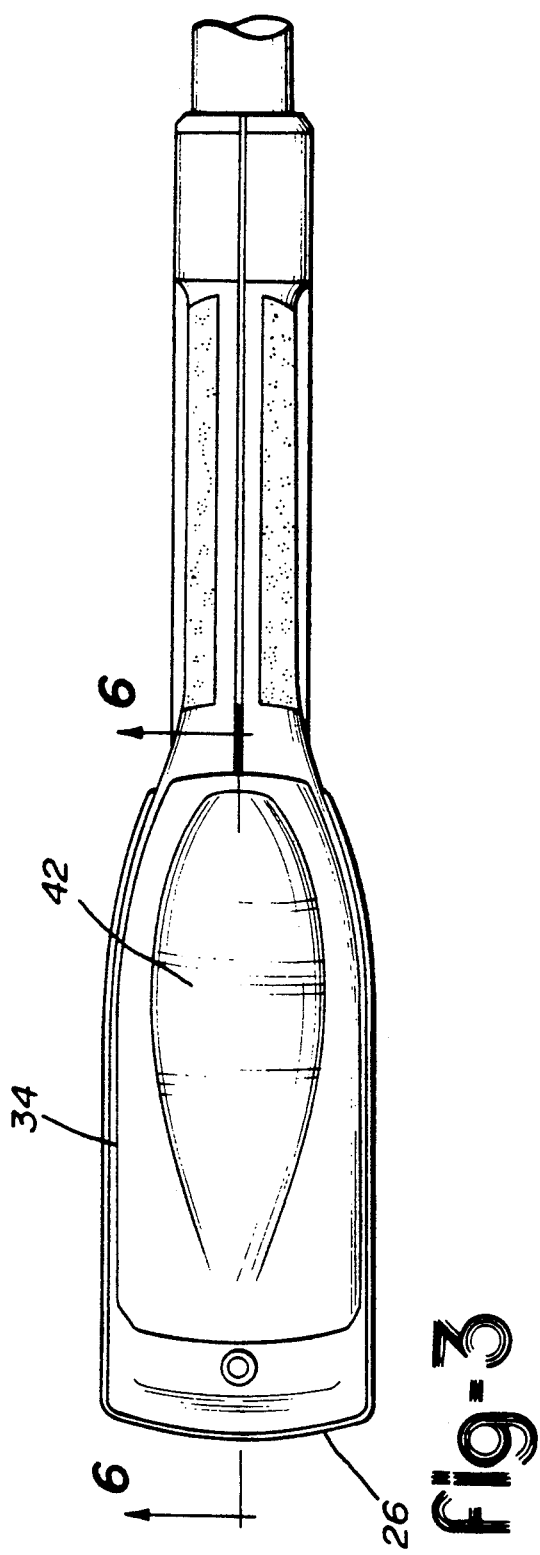

BATTERY POWERED LINE TRIMMER ARM REST

TECHNICAL FIELD

This invention relates generally to line trimmers for cutting vegetation and has particular reference to battery powered line trimmers incorporating an arm rest behind a rear handle.

BACKGROUND ART

Line trimming devices are known in the prior art which are held in the operating position by an operator using both one and two handles. The smaller electrical models are lighter weight and, therefore, tend to have only one handle. However, the larger and heavier gasoline and battery powered models typically incorporate two handles so they are not too cumbersome when maneuvering the line trimming device. While this improves the operator's control and steadiness, it is often difficult for the operator to maintain a grip on the forward handle when the operator is trying to reach under low tree branches or shrubbery to trim the vegetation underneath.

As a result, the operator must often release his grip on the forward handle to reach into these types of places. This, in turn, creates a situation in which the operator must maneuver the line trimming device with only a grip on the rear handle, which is cumbersome and can cause great stress on the operator's wrist as he attempts to maneuver the line trimming device during one-handed operation.

A prior art line trimmer with a rest behind the rear handle is the Weed Eater ® brand "Cordless Clipstik" which has a generally U-shaped bar protruding vertically from the top rear of the battery casing. This member allows an operator to rest his arm, immediately above the wrist, on the top of the U-shaped member when operating it. However, this member extends out so far from the battery casing, it gets in the way under some operating conditions and is not comfortable due to its limited surface area for contact with and proximity to the operator's wrist, even though the top of the U-shaped member is padded. This configuration also does not provide much leverage for one-handed maneuvering since the location of contact with the operator's wrist is so close to the location of contact with the operator's hand on the rear handle.

SUMMARY OF THE INVENTION

The present invention, therefore, contemplates a battery powered line trimmer with an ergonomic configuration which significantly improves handling characteristics and comfort over the prior art when using the line trimmer to cut vegetation under conditions which require the operator to release his grip on the front handle.

Specifically, the present invention contemplates a battery powered line trimmer for cutting vegetation comprising an elongated shaft which, when the trimmer is in the operative position, has a lower forward end and a raised rearward end and an inclined central region therebetween. The line trimmer is further comprised of an electric motor cutting head assembly having a rotating cutting line mounted to the forward end of the elongated shaft. At the rearward end of and generally aligned with the elongated shaft, a battery casing is mounted thereto. A front handle, which is cooperative with the elongated shaft central region, is located rearward of the cutting head, forward of the battery casing, and spaced above the elongated shaft, and has a front grip for one hand of an operator. The line trimmer also has a rear handle cooperative with the elongated shaft. This rear handle has a rear grip for the other hand of the operator and is located adjacent to and forward of the battery casing. Additionally, the line trimmer is comprised of an arm cradle formed in the uppermost side of the battery casing, providing a generally concave cylindrical shaped recess so as to allow the operator's forearm, associated with the hand gripping the rear handle, to rest on the arm cradle during one-handed usage to minimize the stress on the operator's wrist.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a side view of the rear handle and battery casing of a battery powered line trimmer, in accordance with the present invention;

FIG. 2 is a general perspective view of a battery powered line trimmer, in accordance with the present invention;

FIG. 3 is a plan view of a battery powered line trimmer, in accordance with the present invention;

FIG. 4 is a partial cross section taken along line 4—4 of FIG. 2, in accordance with the present invention;

FIG. 5 is a partial cross section taken along line 5—5 of FIG. 2, in accordance with the present invention; and FIG. 6 is a partial cross section taken along line 6—6 of FIG. 3, in accordance with the present invention.

BEST MODE FOR CARRYING OUT THE INVENTION

FIGS. 1 and 2 show a battery powered line trimmer 10 having an elongated shaft 12 with a forward end 14 and a rearward end 16. Fastened to the forward end 14 is a motor housing 18 and a cutting head 20, making up the cutting head assembly. The motor housing 18 contains an electric motor 22, coupled to the cutting head 20 and also the battery (not shown) at the rearward end of the shaft 16.

The battery is enclosed in a battery casing 26, and the battery casing 26 is in turn mounted on and generally aligned with the rearward end 16 of the shaft 12. Molded into the battery casing 26 is the rear handle 28. The front handle 30 clamps to the shaft 12 by way of a bolt 32. This method of attachment allows the axial position of the front handle 30 to be adjusted up or down the shaft 12 to a desired position.

Referring to FIG. 6, an arm cradle 34 is connected at its forward end to the upper side of the battery casing 26 via a pin 36. The ends of the pin 36 are mounted to the battery casing 26. The pin 36 may also be a screw used to hold the battery casing 26 together. At the rearward end of the arm cradle 34, an L-shaped hook member 38 protrudes from the arm cradle 34 to engage a retaining lip 40, which is molded into the battery casing 26. When the pin 36 is removed from the battery casing 26, the L-shaped hook member 38 may be disengaged from the retaining lip 40, thereby allowing access to the battery within the battery casing 26. The arm cradle 34 is made of a conventional material, preferably plastic or rubber.

The arm cradle 34 can also be molded as part of the upper side of the battery casing 26 if so desired.

FIGS. 3-6 show the curvature of the upper surface 42 of the arm cradle 34, which is used as an arm rest during one-handed operation. The upper surface 42 of the arm cradle 34 is a generally concave cylindrical recess within the arm cradle 34, as shown in FIG. 4. Viewed from the top of the battery casing 26, as shown in FIG. 3, the concave cylindrical recess appears as a generally oval shape which starts at the front and ends approximately two-thirds of the way back along the top of the arm cradle 34. This overall shape allows the operator to rest the fleshy part of his forearm comfortably upon the arm cradle 34, even without padding on the upper surface 42, when the situation requires. Such a situation arises when the operator must temporarily release his grip from the front handle 30 due to obstructions such as low tree branches or shrubbery. Then, the operator may adequately maneuver the line trimmer 10 using his grip on the rear handle 28 along with the fleshy part of his forearm resting on the arm cradle 34 for leverage.

Furthermore, should the line trimmer cutting line strike an object imposing a reaction torque on the trimmer, the trimmer will remain relatively stable in the hands on an operator due to its relatively high ratio of mass moment of inertia about a vertical axis extending through its center of gravity. This is disclosed in U.S. application Ser. No. 799,902, Everts, filed Nov. 26, 1991, now patented U.S. Pat. No. 5,181,369 incorporated herein by reference. This high mass moment of inertia will aid the operator in maintaining control of the line trimmer during one handed operation since the high mass moment of inertia will help the line trimmer to resist kick back when the operator is particularly susceptible to kick back problems. On the other hand, with a high mass moment of inertia, the line trimmer will become more difficult to maneuver in general with just one hand, putting a greater strain on the operator's wrist. The arm cradle, then, reduces the strain on the operator's wrist during one handed operation by giving the operator sufficient leverage when maneuvering the line trimmer by allowing the operator to use both a grip on the rear handle and the forearm cooperating with the arm cradle for leverage.

While the best mode for carrying out the invention has been described in detail, those familiar with the art to which this invention relates will recognize various alternative designs and embodiments for practicing the invention as defined by the following claims.

What is claimed is:

1. A battery powered line trimmer for cutting vegetation, the trimmer comprising:

an elongated shaft which when the trimmer is in an operative position has a lower forward end, a raised rearward end, and an inclined central region therebetween;

an electric motor cutting head assembly having a rotating cutting line, the electric motor cutting head assembly mounted to the forward end of the elongated shaft;

a battery casing mounted on and generally aligned with the rearward end of the elongated shaft;

a front handle cooperating with the elongated shaft central region having a front grip for one hand of an operator, located rearward of the cutting head, forward of the battery casing, and spaced above the elongated shaft;

a rear handle cooperating with the elongated shaft having a rear grip for the other hand of the operator, the rear handle located adjacent to and forward of the battery casing; and an arm cradle formed in the uppermost side of the battery casing providing a generally concave cylindrical recess so as to allow the operator's forearm, associated with the hand gripping the rear handle, to rest on the arm cradle during one-handed usage to minimize the stress on the operator's wrist.

2. The battery powered line trimmer of claim 1 wherein the arm cradle has means for removably attaching the arm cradle to the uppermost side of the battery casing to allow access into the battery casing.

3. A battery powered line trimmer for cutting vegetation, the trimmer comprising:

an elongated shaft which when the trimmer is in an operative position has a lower forward end, a raised rearward end and an inclined central region therebetween;

an electric motor cutting head assembly having a rotating cutting line, the electric motor cutting head assembly mounted to the forward end of the elongated shaft;

a battery casing mounted on and generally aligned with the rearward end of the elongated shaft;

a front handle cooperative with the elongated shaft central region having a front grip for one hand of an operator, located rearward of the cutting head, forward of the battery casing and spaced above the elongated shaft;

a rear handle cooperative with the elongated shaft having a rear grip for the other hand of the operator, the rear handle located adjacent to and forward of the battery casing; and an arm cradle formed in the uppermost side of the battery casing providing a generally concave cylindrical recess so as to allow the operator's forearm, associated with the hand griping the rear handle, to rest on the arm cradle during one handed usage to minimize the stress on the operator's wrist, the arm cradle having means for removably attaching the arm cradle to the uppermost side of the battery casing to allow access into the battery casing.

* * * * *